United States Patent [19]
Iijima

[11] Patent Number: 5,748,915
[45] Date of Patent: May 5, 1998

[54] TRANSMISSION METHOD OF CHANGING PROTOCOL AND DATA PROCESSING APPARATUS USING THIS METHOD

[75] Inventor: Yasuo Iijima, Yokoahama, Japan

[73] Assignee: Kabushiki Kaisha Toshiba, Kawasaki, Japan

[21] Appl. No.: 619,322

[22] Filed: Mar. 21, 1996

[30] Foreign Application Priority Data

Mar. 22, 1995 [JP] Japan ................... 7-063100

[51] Int. Cl.$^6$ ..................... G06F 13/42
[52] U.S. Cl. ............. 395/285; 395/500; 364/240.8; 364/DIG. 1
[58] Field of Search ............ 395/285, 500; 364/240.8, DIG. 1

[56] References Cited

U.S. PATENT DOCUMENTS

| | | | |
|---|---|---|---|
| 4,766,534 | 8/1988 | Debenedictis | 364/200 |
| 4,767,920 | 8/1988 | Kitta et al. | 235/492 |
| 4,845,717 | 7/1989 | Iijima | 372/60 |
| 4,855,905 | 8/1989 | Estrada et al. | 364/200 |
| 4,891,783 | 1/1990 | Aritaka et al. | 364/900 |
| 4,930,129 | 5/1990 | Takahira | 371/40.4 |
| 5,136,716 | 8/1992 | Harvey et al. | 395/800 |
| 5,191,653 | 3/1993 | Banks et al. | 395/275 |
| 5,226,155 | 7/1993 | Iijima | 395/600 |
| 5,237,693 | 8/1993 | Kiyohara et al. | 395/725 |
| 5,245,703 | 9/1993 | Hubert | 395/200 |
| 5,278,972 | 1/1994 | Baker et al. | 395/500 |
| 5,349,649 | 9/1994 | Iijima | 395/275 |
| 5,420,412 | 5/1995 | Kowalski | 235/490 |
| 5,551,068 | 8/1996 | Goldsmith et al. | 455/89 |

FOREIGN PATENT DOCUMENTS

| | | |
|---|---|---|
| 0 202 622 | 11/1986 | European Pat. Off. |
| 0513507 | 11/1992 | European Pat. Off. |
| 2 612 316 | 9/1988 | France |
| 62-130040 | 6/1987 | Japan |
| 63-250726 | 10/1988 | Japan |
| 4-321192 | 11/1992 | Japan |

OTHER PUBLICATIONS

ISO/JTC1/SC 17/WG 4 N 416, ISO "Appreciation to KTAS", Jul. 1988.

*Primary Examiner*—John E. Harrity
*Attorney, Agent, or Firm*—Cushman Darby & Cushman IP Group of Pillsbury Madison & Sutro LLP

[57] ABSTRACT

As a method for transferring data between a first data processing apparatus and a second data processing apparatus connected thereto attachably and detachably, there is provided a transmission method of changing protocol having a step for transmitting a first request signal from the first data processing apparatus to the second data processing apparatus, based on a first protocol, for requesting a change from the first protocol to second protocol, a second transmission step for transmitting, when no first response signals to the first request signal are received from the second data processing apparatus, a second request signal to the second data processing apparatus, based on the second protocol, for requesting the change from the first to the second protocol, and a step for determining, in accordance with receiving of a second response signal to the second request signal from the second data processing apparatus, whether data transfer between the apparatuses should be executed or not. There is also provided a data processing apparatus using this method.

17 Claims, 3 Drawing Sheets

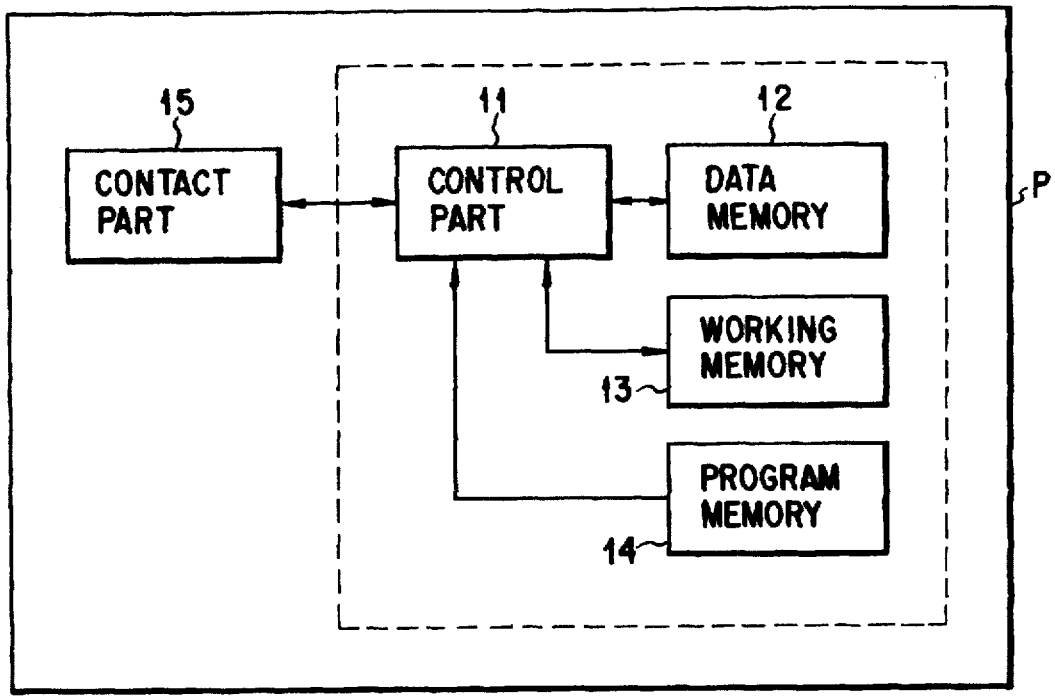
F I G. 2
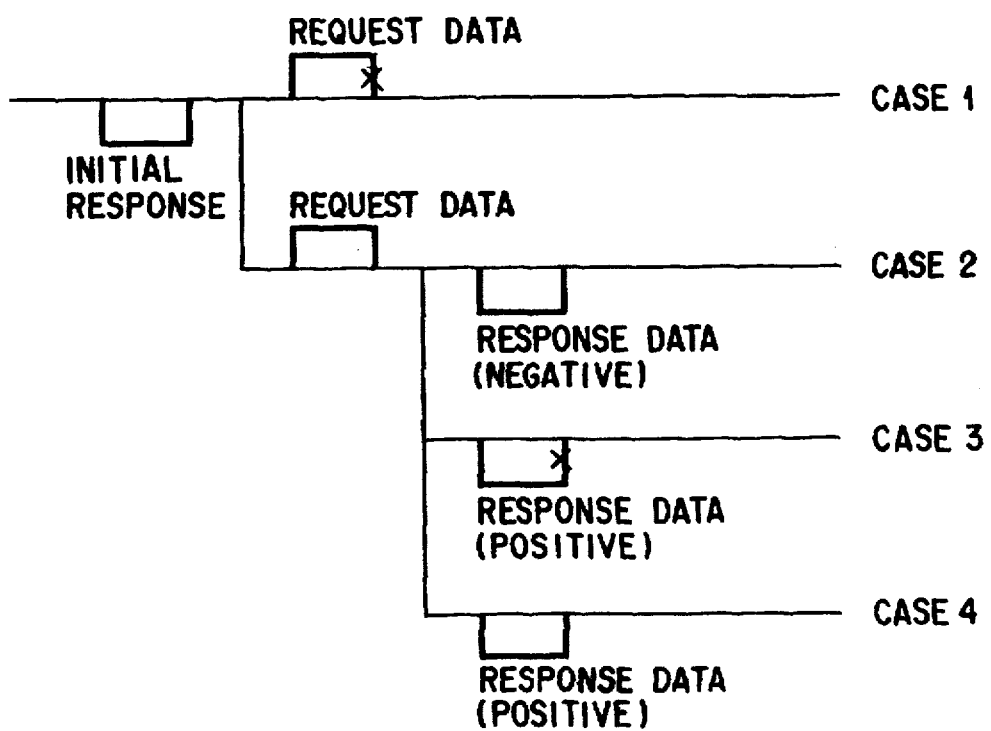
F I G. 3

TRANSMISSION METHOD OF CHANGING PROTOCOL AND DATA PROCESSING APPARATUS USING THIS METHOD

BACKGROUND OF THE INVENTION

1. Field of the Invention

The present invention relates to a protocol changing method for changing a protocol type when data is exchanged, for instance in an external apparatus such as a card reader/writer a card handling apparatus and the like for performing information processing by receiving an inserted IC card therein and exchanging data with this received IC card.

2. Description of the Related Art

In recent years, as an electronic device for storing data and performing information processing, an IC (Integrated Circuit) card has been a focus of attention. In this IC card, an incorporated memory is divided into a plurality of areas and data processed by means of application software is stored in each area. When exchanging data with this IC card, it is necessary for an external apparatus to perform various kinds of information processing by exchanging data with this IC card to access these areas. That is, data transmission is achieved between the external apparatus and the IC card in such a manner that a data string called a command is sent from the external apparatus to the IC card and a data string called a response is sent as a processing result from the IC card to the external apparatus.

There are a plurality of protocols (communication agreements) for data transmission between the IC card and the external apparatus, and more often than not which protocol is to be selected depends on which protocol the IC card supports.

Which protocol is supported by the IC card is indicated by an initial response data (Answer to Reset) output from the IC card when the IC card is inserted into the external apparatus of an IC card reader/writer, etc., and electrically activated. This initial response data indicates, in addition to a type of protocol, for instance a transmission speed.

Recently, there has been developed a technique for selecting, based on this initial response data, one from a plurality of protocol types supported by the IC card and a transmission speed according to request data from the external apparatus.

In this case, for instance if the external apparatus requests a specific transmission speed and the IC card gives permission for this, it is necessary to send response data corresponding to this to the external apparatus, and, when this response data is normally received by the external apparatus, in data transmission thereafter data will be normally transmitted at the requested transmission speed.

In a case where the response data from the IC card does not correctly reach the external apparatus, however, a transmission mode desired by the external apparatus side may be different from that used by the IC card side, making it impossible to perform data transmission thereafter.

SUMMARY OF THE INVENTION

It is an object of the invention to provide a protocol changing method capable of more efficiently changing a type of protocol for data transfer between an IC card and a processing apparatus with this IC card loaded thereon.

According to the invention, a transmission method of changing protocol applied to data transfer processing between a first data processing apparatus and a second data processing apparatus connected thereto attachably and detachably comprises: a first step for transmitting a first request signal from the first data processing apparatus to the second data processing apparatus, based on a first protocol for requesting a change from the first protocol to a second protocol different from the first protocol; a second step for transmitting, when the first data processing apparatus does not receive any first response signal to the first request signal received by the first data processing apparatus from the second data processing apparatus, a second request signal from the first data processing apparatus to the second data processing apparatus, based on the second protocol, for requesting the change from the first protocol to the second protocol; and a third step for determining, in accordance with receiving of a second response signal to the second request signal by the first data processing apparatus from the second data processing apparatus, whether the first data processing apparatus should execute data transfer with the second data processing apparatus or not.

Furthermore, according to the invention, as a data processing apparatus using the above-described method, there is provided a data processing apparatus having means for holding an attachable and detachable second data processing apparatus and transmitting and receiving data to and from the second data processing apparatus; first means for transmitting a first request signal from the transmission means to the second data processing apparatus, based on a first protocol, for requesting a change from the first protocol to a second protocol different from the first protocol; second means for transmitting, when the first data processing apparatus does not receive any first response signal to the first request signal received by the receiving means from the second data processing apparatus, a second request signal from the transmission means to the second data processing apparatus, based on the second protocol, for requesting the change from the first to the second protocol; and third means for determining, in accordance with receiving of a second response signal to the second request signal by the receiving means from the second data processing apparatus, whether data transfer with the second data processing apparatus should be executed or not.

By means of the above-described method of the invention, efficient protocol changing processing is performed in the following manner. That is, when protocol is to be changed in data transfer between an attachable and detachable electronic device such as an IC card and the like and a data processing apparatus with this device loaded thereon, if a response signal from the IC card side does not correctly reach the external apparatus due to noises, etc., conventionally the data processing apparatus side considers that protocol changing has failed at this time and stops further data transfer processing, making it difficult to restore data transfer. On the other hand, according to the method and the apparatus using this method of the invention, even when no response signal is received from the IC card side, a protocol change requesting signal is sent again from the data processing apparatus to the IC card based on a changed protocol. In this way, as long as the IC card operates normally, after protocol is changed as requested, a communication linkage can be established between the IC card and the data processing apparatus. Therefore, it is possible to provide the protocol changing method capable of efficiently restoring protocol changing even when there are obstacles such as noises and the like and the data processing apparatus using this method.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 2 is a block diagram showing an outline of a structure of the IC card;

FIG. 3 is a view illustrating an operation of an initial response; and

DETAILED DESCRIPTION OF THE PREFERRED EMBODIMENTS

Now, explanation will be made of a first embodiment of the invention by referring to the accompanying drawings.

Figure 1:
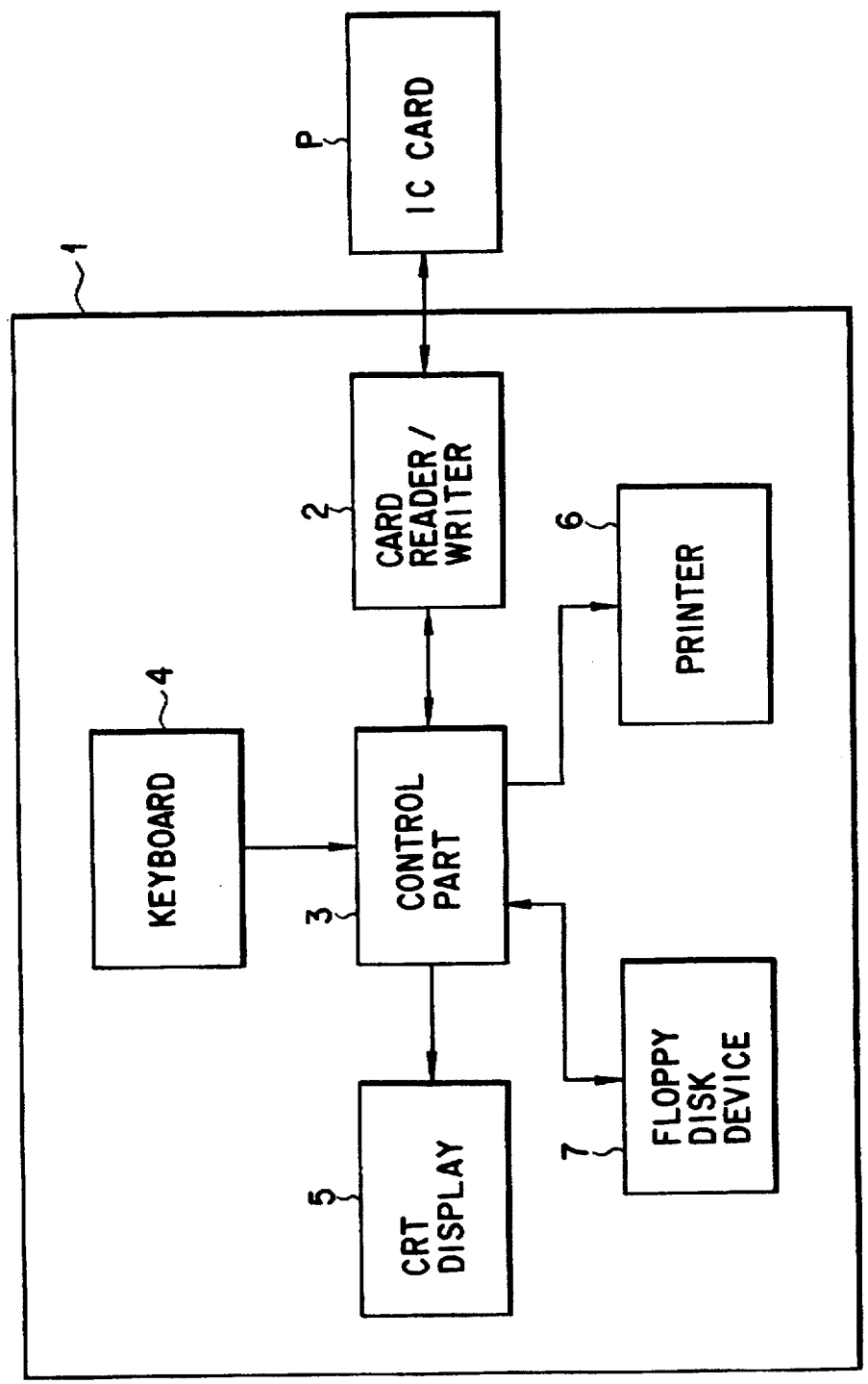
FIG. 1 is a block diagram showing an outline of a structure of a system composed of a card handling apparatus as an external apparatus and an IC card as a portable electronic device in a first embodiment of the invention.

FIG. 1 shows structures of an IC card P as a portable electronic device and, as an external apparatus with the IC card inserted therein for performing information processing by exchanging data with the IC card, a card handling apparatus 1 is used as a terminal device of a financial system, a shopping system, etc., in the first embodiment of the invention. That is, this card handling apparatus 1 is constructed by a card reader/writer 2, a key board 4, a CRT display device 5, a floppy disk device 7 and a printer 6 connected to a control part 3 having a CPU and a memory.

The card reader/writer 2 into which the IC card P is inserted is for transmitting and receiving data to and from the IC card P.

The control part 3 is for controlling the whole card handling apparatus 1.

A user inputs various instructions from the key board 4 according to an operation guide displayed on the CRT display device 5 and information necessary because of an instruction from the user is printed by means of the printer 6.

The floppy disk device 7 having, for instance a floppy disk in which confidential data, etc., are stored, is for reading recorded data when necessary and recording necessary information in the floppy disk.

FIG. 2 shows a structure of the IC card P.

In FIG. 2, the IC card P is constructed by a data memory 12, a working memory 13, a program memory 14 and a contact part 15 connected to a control part 11 composed of a CPU, etc.

The data memory 12 composed of a read-only-memory, for instance a EEPROM, is for storing various data necessary for information processing in the IC card P.

The program memory 14 composed of, for instance, a mask ROM, is for storing a control program, etc., for the IC card P.

The control part 11 composed of a CPU, etc., is for performing control in the IC card P and is operated in accordance with the control program stored in the program memory 14.

The working memory 13 composed of a write/read ROM is for temporarily storing, during execution of information processing by means of the control part 11, an intermediate result thereof.

A part surrounded by a broken line including the control part 11, the data memory 12, the working memory 13, the program memory 14 is composed of an IC chip (or a plurality of IC chips) and buried in an IC card P main body.

The contact part 15 is constructed so as to obtain electric contact with the card reader/writer 2 when the IC card P is inserted therein. When the IC card P is inserted into a card reader/writer 1, a power voltage, a clock signal, a reset signal and various data are supplied to the IC card P via the contact part 15 and thereby data transfer with the card handling apparatus 1 can be performed via an I/O terminal of the contact part 15.

When the IC card P is inserted into the card reader/writer 2 of the card handling apparatus 1 thus constructed, a power voltage, a clock signal and a reset signal are supplied from the card handling apparatus 1 to the control part 11 of the IC card P via the contact part 15, the IC card P is activated and in the activated IC card P, a response data is made under controlling of the control part 11 by using various data stored in the data memory 12 and sent to the card handling apparatus 1 via the I/O terminal of the contact part 15. Then, when the card handling apparatus 1 receives the response data from the IC card P, data exchange can be performed between the card handling apparatus 1 and the IC card P via the I/O terminal of the contact part 15. For instance request data is sent from the card handling apparatus 1 to the IC card P and response data corresponding to the request data is sent from the IC card P to the card handling apparatus 1.

Next, explanation will be made of data receiving and sending, that is, an initial response (Answer to Reset) operation, in data exchange between the card handling apparatus 1 and the IC card P executed when the IC card P as a portable electronic device is inserted into the card reader/writer of the card handling apparatus 1 as an external apparatus 1 like that shown in FIG. 1. Here, the initial response provides for sending and receiving of request data for specifying defined protocol and transmission speed sent from the card handling apparatus 1 and response data sent from the IC card P.

With respect to this operation, as shown in FIG. 3, there are four cases depending on normal sending and receiving of request data and response data and permission given by the IC card P to protocol and transmission speed requested by the card handling apparatus.

In FIG. 3, a case 1 is where the IC card P cannot normally receive request data specifying defined protocol and transmission speed sent from the card handling apparatus 1 due to noises, etc., on a data transmission path. In this case, the IC card P determines the request data as an invalid data string and is placed under a standby state for a data string according to original protocol and transmission speed. At this time, the card handling apparatus 1 determined no response.

A case 2 is where the IC card P outputs response data giving no permission to request data because the IC card P does not support the requested protocol and transmission speed though it normally receives the request data sent from the card handling apparatus 1 and this response data is normally received by the card handling apparatus 1. In this case, the IC card P is placed under a standby state for a data string according to original protocol and transmission speed.

A case 3 is where the IC card P normally receives request data sent from the card handling apparatus 1 while supporting requested protocol and transmission speed and outputs response data giving permission to this, but this response data is not normally received by the card handling apparatus 1. The card handling apparatus 1 side determines this as no response. In this case, the IC card P is placed under a standby state for a data string according to protocol and transmission speed requested by request data.

A case 4 is where the IC card P normally receives request data sent from the card handling apparatus 1 while supporting requested protocol and transmission speed and outputs response data giving permission to this and this response data is normally received by the card handling apparatus 1. In this case, the IC card P is placed under a standby state for a data string according to the protocol and transmission speed requested by the request data.

In the cases 2 and 4 in FIG. 3, since the request data sent from the card handling apparatus 1 is normally received by the IC card P and the response data sent from the IC card P is normally received by the card handling apparatus 1, the protocol and transmission speed according to which the IC card P is under a standby state for a data string are changed to a defined protocol and transmission speed specified by the card handling apparatus 1, and it is possible for the card handling apparatus 1 to determine, based on the response data, the protocol and transmission speed while the IC card P is under a standby state for a data string.

On the other hand, in the cases 1 and 3 in FIG. 3, since in the case 1 the request data from the card handling apparatus 1 is not normally received though a responding state of the IC card P seen from the card handling apparatus 1 side is the same (that is, the response data cannot be normally received by the card handling apparatus 1), the original protocol and transmission speed with the IC card P under a standby state for a data string are kept, and in the case 3, since the request data from the card handling apparatus 1 is normally received, the protocol and transmission speed with the IC card P under a standby state for a data string are changed as requested by the card handling apparatus 1. In this case, since the response data cannot be normally received by the card handling apparatus, the protocol and transmission speed with the IC card P under a standby state for a data string cannot be determined.

Therefore, the protocol and transmission speed with the IC card P under a standby state for a data string must be confirmed in accordance with a second procedure explained hereinbelow.

Here, in the initial response operation like that shown in FIG. 3, it is assumed that a transmission speed specified for sending request data (hereinafter called initializing command data) from the card handling apparatus 1 to the IC card P is 19200 bps, transmission speeds supported by the IC card P are 9600 bps and 19200 bps and a default is 9600 bps. Also, as shown in FIG. 3, a procedure from transmitting an initializing command from the card handling apparatus 1 to the IC card P to receiving of response data corresponding thereto or determination of no response is a first procedure.

A problem occurs in the cases 1 and 3 during the first procedure where no response data from the IC card P is received. In the cases 1 and 3 during the first procedure, the card handling apparatus 1 transmits, when no response data from the IC card P even after the lapse of a specified period is received (no response), request data (hereinafter called protocol request data) again for requesting a transmission speed 19200 bps to the IC card P at the transmission speed 19200 bps specified by the initializing command data.

Then, in the case 1 during the first procedure, the IC card P is placed under a standby state for a data string at 9600 bps, the protocol request data transmitted at 19200 bps is determined to be invalid data and thus no response data is output.

In the case 3 during the first procedure, since the IC card P is under a standby state for a data string at 19200 bps, the protocol request data can be normally received and also since at this time the protocol supporting the transmission speed thereof is applied in the IC card P, positive response data permitting the transmission speed specified by the protocol request data is sent to the card handling apparatus 1.

In the IC card handling apparatus 1, when no response data are received from the IC card P as a result of a second procedure and no response is determined, it is possible to determine, as in the cases 1 and 3 as a result of the first procedure, whether or not to support the transmission speed specified by a protocol type applied in the IC card P. At this time, processing moves to a next procedure.

On the other hand, when it receives response data from the IC card P as a result of the second procedure, the IC card handling apparatus 1 can determine that the IC card P has understood the content of the request made by means of the reset command data and already has applied the protocol supporting the transmission speed of 19200 bps.

As described above, in the case 1 shown in FIG. 3, even after the second procedure is finished, the IC card P is under the standby state for a data string at the transmission speed of 9600 bps. Thus, when request data requesting protocol supporting the transmission speed 19200 bps from the card handling apparatus 1 is transmitted at the speed before requesting (9600 bps), again as shown in FIG. 3, each case comes into existence as a result of the first procedure. Thereafter, processing is performed according to each case and when necessary this is repeated. When the second step is repeated several times, it can be understood that no normal receiving of the request data from the card handling apparatus 1 by the IC card P is the cause.

Therefore, at least for the case 3 regarding the result of the first procedure where the protocol (transmission speed) cannot be correctly changed because of the fact that the card handling apparatus 1 cannot normally receive the response data from the IC card P, in order to efficiently restore changing of the protocol, a no response permission frequency is set in the card handling apparatus 1 as an upper limit of the number of times for sending request data to the IC card P, and only when no response data corresponding to the transmitted request data is received before this set value is reached, determining that data communication with the IC card P cannot be performed because the request data from the card handling apparatus 1 is not normally received by the IC card P, processing for rejecting the IC card P is performed. On the other hand, if response data from the IC card P is received by the card handling apparatus 1 before the set value is reached, as in the case 2 or 4 shown in FIG. 3, it is determined that protocol has been correctly changed.

Next, explanation will be made of a protocol changing method of the invention based on the above-described procedure, in particular a method of changing a transmission speed as one of protocol types by referring to a flow chart shown in FIG. 4.

In the card handling apparatus 1, when protocol supporting a predetermined transmission speed is to be requested to the IC card P inserted into the card reader/writer 2, in step S1, a no response permission frequency value (for instance 3) is set in a counter provided in, for instance, the control part 3 of the card handling apparatus 1.

Then, the card handling apparatus 1 transmits request data (reset command data) for changing a transmission speed to a predetermined speed to the IC card P by using a currently used transmission speed (step S2). The card handling apparatus 1 is placed under standby for response data from the IC card P.

In this state receiving of response data from the IC card P within a preset period is monitored (step S3) and when the receiving thereof is confirmed, processing moves to step S4.

In step S4, the card handling apparatus 1 checks to see whether the response data received from the IC card P permits the transmission speed requested to the IC card P by means of the request data in step S2 or not, and if this is positive response data, thereafter between the card handling apparatus 1 and the IC card P data will be exchanged at the transmission speed requested to the IC card P by means of the request data in step S2 (S11).

On the other hand, if negative response data is determined in step S4, a content of this response data is confirmed and checking is made on whether the IC card P permits other transmission speeds or not (step S5).

In step S5, when no permission of the other transmission speeds by the IC card P is determined, thereafter between the card handling apparatus 1 and the IC card P, data will be exchanged at the original transmission speed, that is, the speed when the card handling apparatus 1 sends the request data to the IC card P in step S2 (S12). When permission of the other transmission speeds by the IC card P is determined, one of the transmission speeds is used as a new transmission speed for the card handling apparatus 1 and processing returns to step S2.

In step S3, if no response data from the IC card P is received by the card handling apparatus 1, processing moves to step S6.

In step S6, the card handling apparatus 1 sends request data for changing the transmission speed to the predetermined speed to the IC card P at the predetermined transmission speed. Then, the card handling apparatus 1 is placed under standby for response data from the IC card P.

In this state receiving of response data from the IC card P within a preset period is monitored (step S7) and when the receiving thereof is confirmed, processing moves to step S4.

In step S7, if no response data from the IC card P is received by the card handling apparatus 1, moving to step S8, the counter value set in step S1 is reduced by one and checking is made to see if a result is "0" (step S9). When the counter value is not "0", return to step S2 and the same processing is repeated.

On the other hand, if the counter value "0" is determined in step S9, moving to step S10 the IC card P is ejected from the card reader/writer 2.

Figure 4:
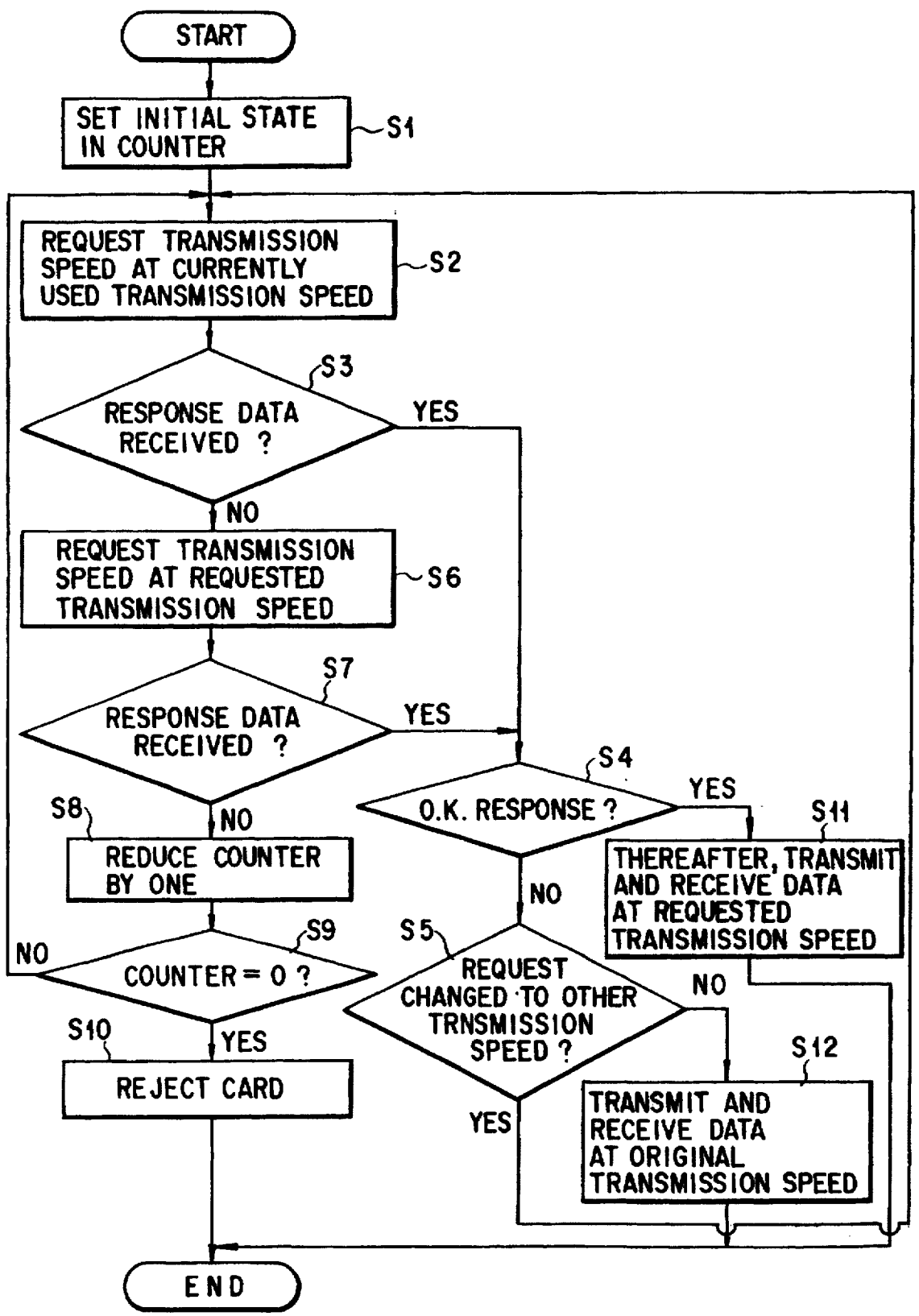
FIG. 4 is a flow chart illustrating a specific example of a protocol changing method between the IC card and the card handling apparatus shown in FIG. 1.

The flow chart in FIG. 4 illustrates a case where a transmission speed is changed among protocol types regarding data exchanges between the IC card P and the card handling apparatus 1. Other than this, the flow chart can be applied to cases where the protocol types or items other than the transmission speed are changed as long as request data regarding these is sent from the card handling apparatus 1 to the IC card P in step S2 and in step S6.

Also, in the flow chart shown in FIG. 4, in step S9 the IC card P is ejected when the counter value reaches the no response permission frequency. But the case is not limited to this. For instance, when the counter value reaches the no response permission frequency in step S9, the card handling apparatus 1 transmits a reset signal for initialization to the IC card P, and when no response data corresponding to the reset signal is received from the IC card P, determining that data communication cannot be performed with the IC card P because of no correct receiving of the request data by the IC card P from the card handling apparatus 1 the IC card P may be ejected in the end.

Furthermore, in the flow chart shown in FIG. 4, when the counter value reaches the no response permission frequency in step S9, the card handling apparatus 1 first resets the no response permission frequency value (for instance 3) in the counter provided in the control part 3 thereof, sends the reset signal for initialization to the IC card P, continues sending this reset signal to the IC card P while reducing the counter value one by one until this receives response data corresponding to the reset signal from the IC card P, and when no response data is received from the IC card P even when the value is "0", determining that data communication cannot be performed with the IC card P because of no correct receiving of the request data by the IC card P from the card handling apparatus 1, the IC card may be ejected in the end. In this case, as a cause of no correct receiving of the request data by the IC card P from the card handling apparatus 1, a contact failure between the IC card P and the contact part 15 or with the card reader/writer 2 of the card handling apparatus 1 can be considered.

As described above, according to the embodiment, in the card handling apparatus 1, when predetermined protocol (transmission speed) is requested to the IC card P inserted into the card reader/writer 2, the card handling apparatus 1 first sets a no response permission frequency value (for instance 3) in the counter provided in the control part 3, sends request data (reset command data) for changing a transmission speed to the predetermined protocol (transmission speed) to the IC card P by using a currently used transmission speed, and when there is no response data received from the IC card P, the card handling apparatus 1 sends request data for changing to the predetermined protocol (transmission speed) to the IC card P at the requested protocol (transmission speed), and when the counter value is reduced one by one and no response data is received from the IC card P before the counter value is "0", the apparatus 1 finally determines impossibility of data exchanges with the IC card P because no request data from the card handling apparatus 1 is correctly received by the IC card P and ejects the IC card P. In this way, even when protocol (transmission speed) changing is not correctly performed, restoration thereof can be efficiently made and it is possible to increase a processing speed for the whole system composed of the IC card P and the card handling apparatus 1.

Furthermore, when the counter value is "0", the card handling apparatus 1 resets a no response permission frequency value (for instance 3) in the counter provided in the control part 3, sends a reset signal for initialization to the IC card P, reduces the counter value one by one until it receives response data corresponding to the reset signal from the IC card P, and if it receives no response data therefrom even when the counter value reaches "0", the apparatus 1 finally determines impossibility of data exchanges with the IC card P because no request data from the apparatus 1 is normally received by the IC card P and ejects the IC card P. In this way, even when protocol (transmission speed) is not normally performed, restoration thereof can be efficiently made and it is possible to increase a processing speed for the whole system composed of the IC card P and the card handling apparatus.

It is clear from the foregoing description that according to the invention, even in a case where changing of a transmission speed cannot be normally performed when a protocol or a transmission speed is to be changed according to a request from the external apparatus in data transfer between the portable electronic device and the external apparatus, it is possible to provide a protocol changing method capable of efficiently performing restoration thereof and increasing a processing speed for the whole system composed of the portable electronic device and the external apparatus.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A transmission method of changing communication protocol between a first data processing apparatus and a second data processing apparatus connected to the first data processing apparatus, comprising:

first step for transmitting a first request signal from the first data processing apparatus to the second data processing apparatus on the basis of a first protocol, for requesting a change from the first protocol to a second protocol different from the first protocol;

second step, in the first data processing apparatus, for confirming a first response signal to the first request signal from the second data processing apparatus;

third step for transmitting, when a first response signal to the first request signal is not confirmed at the second step, a second request signal from the first data processing apparatus to the second data processing apparatus on the basis of the second protocol, for requesting a change from the first protocol to the second protocol;

fourth step, in the first data processing apparatus, for confirming a second response signal to the second request signal from the second data processing apparatus; and fifth step for determining, in accordance with one of the confirming of the first response signal at the second step and the confirming of the second response signal at the fourth step, whether the first data processing apparatus should execute data transfer with the second data processing apparatus on the basis of the second protocol.

2. A transmission method according to claim 1, wherein the third step includes:

step for preventing, before a passage of a specified period without the first response signal being received by the first data processing apparatus from the second data processing apparatus, the first data processing apparatus from transmitting the second request signal.

3. A transmission method according to claim 1, further comprising:

step for disconnecting, when the first data processing apparatus receives no second response signal from the second data processing apparatus after the second request signal is transmitted the specified number of times, the second data processing apparatus from the first data processing apparatus.

4. A transmission method according to claim 1, wherein the third step includes:

sixth step for repeating, when the first data processing apparatus receives neither the first nor the second response signal from the second data processing apparatus, the first, second, third, fourth and fifth steps a specified number of times until the first data processing apparatus receives a second response signal to the second request signal from the second data processing apparatus.

5. A transmission method according to claim 4, further comprising:

step for transmitting, when the first data processing apparatus receives no response signal from the second data processing apparatus after the repeating step is performed the specified number of times, a reset signal for initializing the second data processing apparatus from the first data processing apparatus to the second data processing apparatus.

6. A transmission method according to claim 4, further comprising:

transmitting, when the first data processing apparatus receives no response signal from the second data processing apparatus after the repeating step is performed the specified number of times, a reset signal for initializing the second data processing apparatus from the first data processing apparatus to the second data processing apparatus a second specified number of times until a response signal to the reset signal is transmitted from the second data processing apparatus to the first data processing apparatus.

7. A transmission method according to claim 1, wherein the first step includes:

sixth step for transmitting a third request signal from the first data processing apparatus to the second data processing apparatus at a first transfer speed, for requesting a change from the first transfer speed to a second transfer speed different from the first transfer speed;

wherein the third step includes:

seventh step for transmitting, after a passage of a specified period with no third response signal to the third request signal being received by the first data processing apparatus from the second data processing apparatus, a fourth request signal from the first data processing apparatus to the second data processing apparatus at the second transfer speed, for requesting a change from the first transfer speed to the second transfer speed.

8. A transmission method according to claim 1, further comprising:

sixth step for returning to the first step and repeating procedures of the first, second, third and fourth steps when the second response signal is not confirmed at the fourth step.

9. A data processing apparatus with the capability of changing communication protocol with an attachable/detachable second data processing apparatus connected to the data processing apparatus, comprising:

means for holding the second data processing apparatus;

first means for transmitting a first request signal to the second data processing apparatus, held by the holding means, on the basis of a first protocol, for requesting a change from the first protocol to a second protocol different from the first protocol;

second means for confirming a first response signal to the first request signal from the second data processing apparatus;

third means for transmitting, when a first response signal to the first request signal is not confirmed by the second means, a second request signal to the second data processing apparatus on the basis of the second protocol, for requesting a change from the first protocol to the second protocol;

fourth means for confirming a second response signal to the second request signal from the second data processing apparatus; and fifth means for determining, in accordance with one of the confirming of the first response signal at the second means and the confirming of the second response signal at the fourth means, whether the data processing apparatus should execute data transfer with the second data processing apparatus on the basis of the second protocol.

10. A data processing apparatus according to claim 9, wherein the third means includes:

means for preventing, before a passage of a specified period for the first response signal to be received by the receiving means from the second data processing apparatus, the second means from transmitting the second request signal.

11. A data processing apparatus according to claim 10, wherein the third means includes:

sixth means for causing, when the first data processing apparatus receives neither the first nor the second response signal from the second data processing apparatus, the first, second, third, fourth and fifth means to repeatedly operate a specified number of times until the fourth means receives the second response signal from the second data processing apparatus.

12. A data processing apparatus according to claim 11, further comprising:

means for disconnecting, when the receiving means receives no response signal from the second data processing apparatus after the second request signal is transmitted the specified number of times, the second data processing apparatus from the holding means.

13. A data processing apparatus according to claim 11, further comprising:

means for transmitting, when no response signal is received from the second data processing apparatus after the procedures are repeated the specified number of times, a reset signal from the transmission means to the second data processing apparatus for initializing the second data processing apparatus.

14. A data processing apparatus according to claim 11, further comprising:

means for transmitting, when no response signal is received from the second data processing apparatus after the procedures are repeated the specified number of times, a reset signal from the transmission means to the second data processing apparatus for initializing the second data processing apparatus a second specified number of times until a response signal to the reset signal is transmitted from the second data processing apparatus to the first processing apparatus.

15. A data processing apparatus according to claim 9, wherein the first transmission means includes:

sixth transmission means for transmitting a third request signal from the transmission means to the second data processing apparatus at a first transfer speed, for requesting a change from the first transfer speed to a second transfer speed different from the first;

wherein the third means includes:

seventh means for transmitting, after a passage of a specified period with no third response signal to the third request signal being received by the transmission means from the second data processing apparatus, a fourth request signal from the transmission means to the second data processing apparatus at the first transfer speed, for requesting the change from the first transfer speed to the second transfer speed.

16. A data processing apparatus with the capability of changing communication protocol between itself and an IC card using a first protocol and a second protocol different from the first protocol, comprising:

first means for transmitting a first request signal to the IC card on the basis of the first protocol, for requesting a change from the first protocol to the second protocol;

second means for confirming a first response signal to the first request signal from the IC card;

third means for transmitting a second request signal to the IC card on the basis of the second protocol, when the second means does not confirm a first response signal;

fourth means for confirming a second response signal to the second request signal from the IC card; and fifth means for determining, in accordance with one of the confirming of the first response signal at the second means and the confirming of the second response signal at the fourth means, whether the apparatus should execute data transfer with the IC card on the basis of the second protocol.

17. A data processing apparatus according to claim 15, further comprising:

sixth means for changing, when the fourth means does not confirm a second response, the communication protocol with the IC card from the second protocol to the first protocol, and transmitting a request signal on the basis of the first protocol to the IC card for requesting a change from the first protocol to the second protocol.

* * * * *